United States Patent Office 3,005,550
Patented Oct. 24, 1961

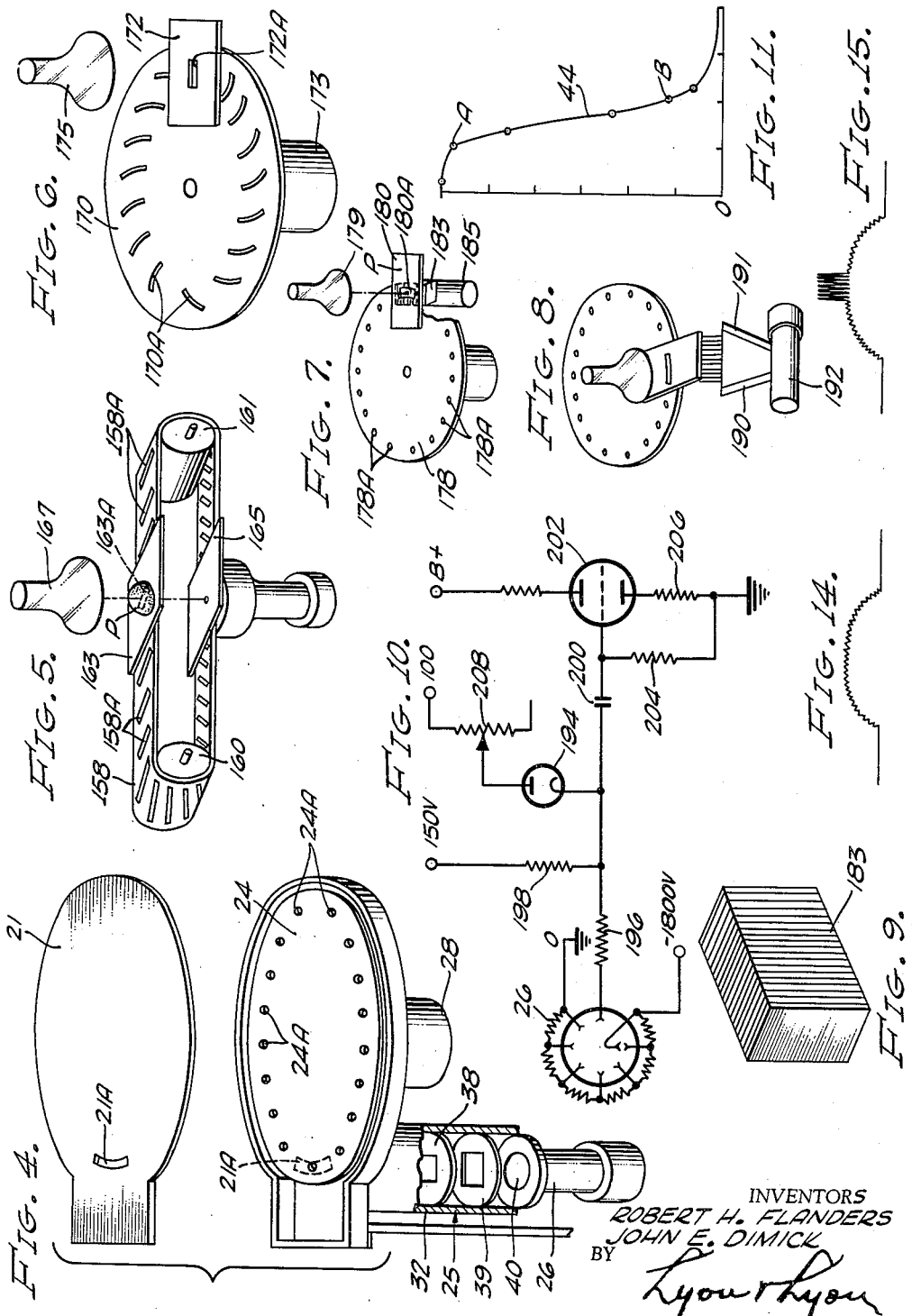

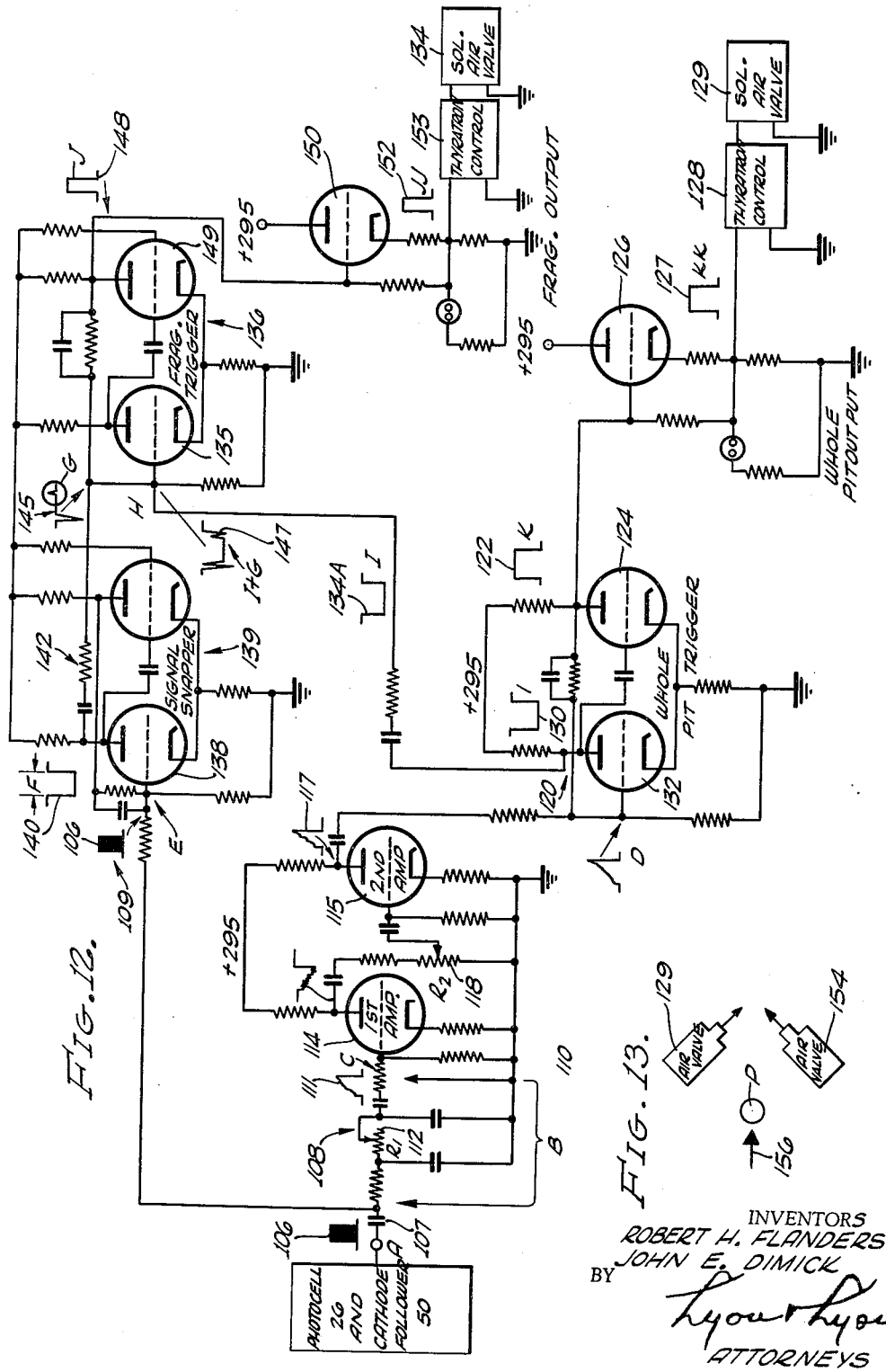

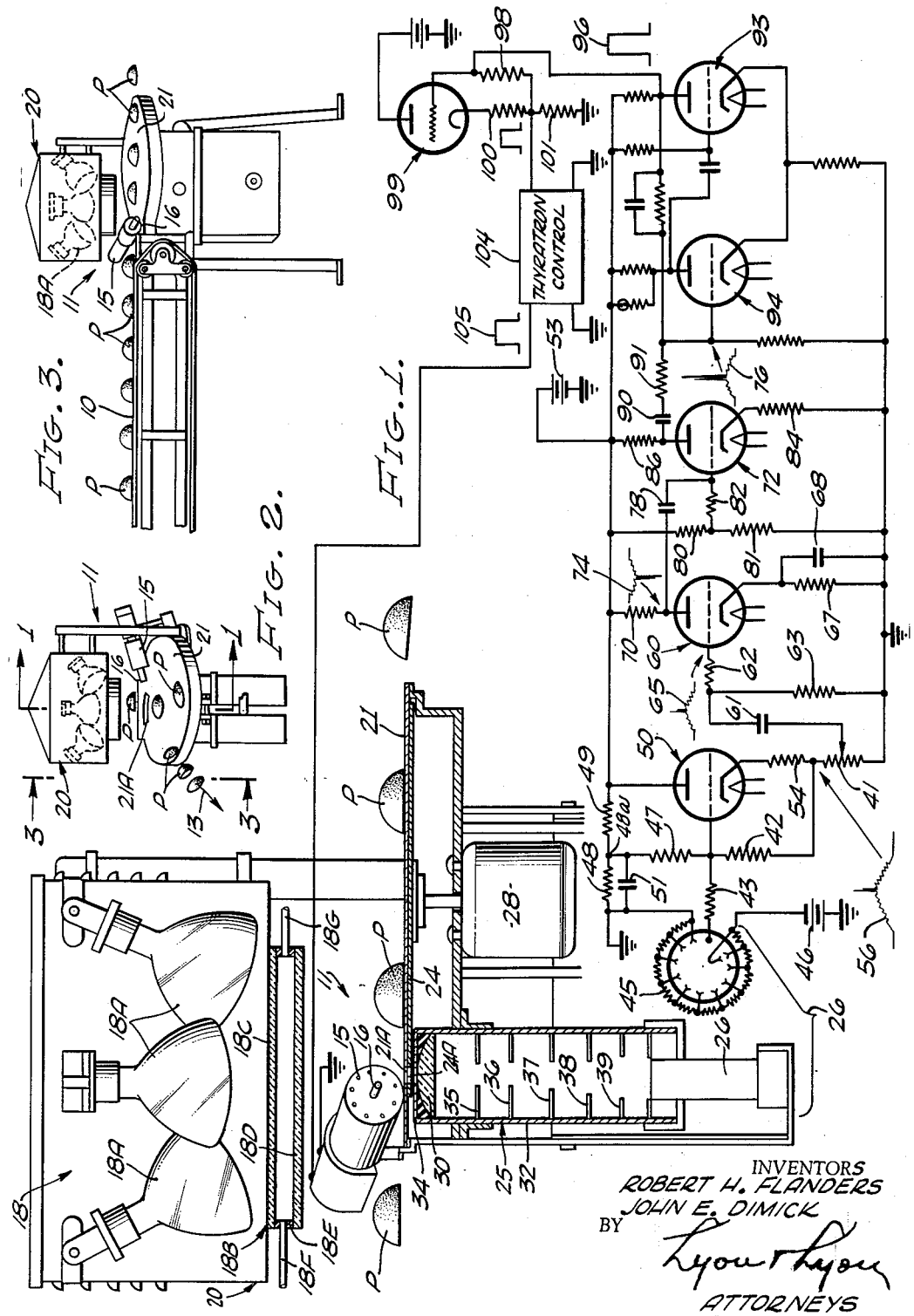

3,005,550
PEACH PIT FRAGMENT DETECTION MEANS AND TECHNIQUES
Robert H. Flanders, Concord, and John E. Dimick, El Cerrito, Calif., assignors to California Packing Corporation, San Francisco, Calif., a corporation of New York
Filed Apr. 26, 1957, Ser. No. 655,377
11 Claims. (Cl. 209—111.5)

The present invention relates to improved means and techniques for detecting the presence of a peach pit or fragments thereof in a peach half and for classifying the peach halves accordingly, the present invention constituting generally an improvement in the system described and claimed in our copending application with Roy Amara, United States patent application Serial No. 604,558, filed August 16, 1956.

In some peach canneries, peaches may, for example, be cut in half and the peach pit removed by a pitter, after which the outer skin is removed or peeled and the peach halves are then conveyed past inspection stations, at which peach halves are inspected for blemishes, discoloration, peach pits and fragments thereof prior to canning. Such inspection and removal of undesired peach halves, peach pits and fragments thereof are carried out manually as a result of visual observation.

The operation of the peach pitter, while satisfactory, is not one hundred percent perfect, and as a result many of the peach halves still retain a peach pit half or smaller fragment of a peach pit. This necessitates the employment of many inspectors, as indicated above, who visually inspect the peach halves for attached peach pit fragments.

The present arrangement serves to inspect each peach half, using a photocell to develop a suitable control voltage when the peach half has attached thereto a pit fragment, and to use such control voltage to separate those peach halves having pit fragments attached thereto. A unique feature of the present arrangement is that the peach half cavity is scanned with a "spot" of light when and as the peach half travels through an inspection station so as to allow the use of only one photocell instead of a plurality of photocells as described in our above mentioned patent application.

In the system shown in our above mentioned application, eight photocells are used with eight separate light collimators. The collimators are made of polished Lucite rods with their sides painted black. The purpose of each collimator is to view just the area directly adjacent to its upper end. With this arrangement, as the peach half travels over the ends of the collimators a series of adjacent parallel paths across the peach half is individually viewed, and light gathered by each collimator is directed to a separate photocell. This is equivalent to having eight different pit detecting machines and requires eight different sensitivity controls; and, due to the inherent sensitivity drift of photocells, frequent resetting of the sensitivity controls is a requirement. Further, if the peach half contains a small fragment which passes between two adjacent collimators, the chances of detection are reduced; also, the larger and more optically dense the peach tissue, the smaller the fragment size which can be detected in such eight-channel system.

The present arrangement, on the other hand, is far more capable of detecting small fragments than is the eight-channel pit sorter. Not only is it more sensitive, but it is simpler to operate. These new and improved results are attributed to the use of a scanning system by which it is possible to limit the instantaneous coverage to a very small area of the peach half. Such scanning is accomplished, in accordance with the preferred embodiment, by using a scanning disc having a series of small holes spaced approximately every two inches around the disc, the disc having approximately an eleven inch diameter.

It is therefore a general object of the present invention to provide improved means and techniques for detecting the presence of halves of peach pits, or fragments thereof, that may be clinging to a peach half and to effect a classification accordingly.

A specific object of the present invention is to provide an improved system of this character by which satisfactory results are obtained with the use of a single photocell.

Another specific object of the present invention is to provide an improved system of this character which is more sensitive and easier to operate than the system described in our above mentioned application.

Another specific object of the present invention is to provide a system of this character that incorporates means for scanning a particular cavity.

Another specific object of the present invention is to provide a system of this character that incorporates a novel optical system for these purposes.

Another object of the present invention is to provide an improved system of this character in which a single photocell may be used in axial alignment with a lens system and such that only a relatively small area of the photo sensitive surface of the tube is used whereby a simple compact structure results with the measurements thus being more uniform than would otherwise be the case if a larger photo sensitive surface were required.

Another specific object of the present invention is to provide an improved system of this character in which precautions are taken to prevent direct illumination of the phototubes by a lamp source, when no peach half is at the inspection station.

Another object of the present invention is to provide an improved system of this character in which the phototube is in a substantially saturated condition when either there is no peach half at the inspection station or when the peach half at the inspection station is clean of any halved pit or fragment thereof.

Another specific object of the present invention is to provide an improved system of this character in which nonlinear amplifiers are coupled to the phototube and serve to amplify those output signals of the photocell having large amplitude in greater proportion than those output signals of relatively small amplitude.

Another specific object of the present invention is to provide a system of this character for developing a series of pulses, the number of which is determinative of the size of the pit half or fragment thereof.

Another specific object of the present invention is to provide a system as indicated in the preceding paragraph in which means are incorporated for separating peach halves in accordance with the size of the pit half or fragment thereof.

Another specific object of the present invention is to provide a system of this character in which a pit fragment as small as approximately one-eighth of an inch in diameter can be detected.

Another specific object of the present invention is to provide a system of this character in which a single phototube of the so-called end-on type is conveniently incorporated in a compact arrangement.

Another object of the present invention is to provide an improved system of this character which incorporates novel electrical circuitry for these purposes, and one which is capable of operating either in conjunction with a phototube which is either predominantly sensitive to blue light or predominantly sensitive to infra-red light or to any other color.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a system embodying features of the present invention. This figure includes a sectional view of apparatus with the section being taken substantially on the line 1—1 of FIGURE 2; this figure also shows the associated electrical circuitry for operating the air valve.

FIGURE 2 is a view in elevation of the apparatus shown structurally in FIGURE 1 taken at a viewpoint towards which the peach halves travel.

FIGURE 3 is a view in side elevation of the apparatus shown in FIGURE 2 and corresponds to a view taken generally in the direction indicated by the lines 3—3 in FIGURE 2.

FIGURE 4 is a perspective view of a portion of the optical system shown in the previous figures with portions being fragmented and illustrated in section and with the top window plate removed for purposes of indicating detailed constructional features.

FIGURES 5, 6, 7 and 8 illustrate other scanning systems.

FIGURE 9 is a perspective view illustrating a light collimator which is used in the modified scanning systems illustrated in FIGURES 7 and 8.

FIGURE 10 illustrates a modified circuit involving a clamp tube.

FIGURE 11 is a graphical illustration of the operating range of the phototube used in any one of the scanning systems illustrated herein.

FIGURE 12 illustrates a modified circuit for classifying peach halves in accordance with the relative size of the peach pit or fragment thereof that may be clinging to the peach half.

FIGURE 13 illustrates the arrangement of two air valves that are operated by the circuit shown in FIGURE 12.

FIGURES 14 and 15 illustrate generally the character of various output signals developed by the photocell 26.

It is understood that the arrangement illustrated in connection with FIGURES 1–4 and 11 constitutes the preferred form of the present invention and that the modified scanning system illustrated in FIGURES 5, 6, 7 and 8 show other scanning systems which are considered to be included within the broad aspects of certain features of the present invention, although they are not considered to have the same practical value as the preferred system illustrated in connection with FIGURES 1–4 and 11.

The present arrangement presupposes that peaches are cut in half by a conventional peach pitter which serves also to remove the cut peach pit and also fragments of the halved peach pit from most of the peach halves, while at the same time failing to properly remove the halved pit or fragments thereof from the other peach halves, as is usually the case in canneries functioning to can peach halves. Also, it is presupposed that the peach halves are unpeeled and wetted by water baths (although it is not necessary that the peach halves be wet) used in conjunction with operation of the peach pitter before being subjected to the inspection and classifying apparatus presently described. As a practical matter, the peach halves are sorted before peeling, but if desired, sorting may be accomplished after the peach half is peeled. It is considered that the apparatus functions for its intended purposes either with peeled or unpeeled peach halves and whether or not such peach halves are originally graded as to size or ungraded before being subjected to electronic inspection, although it is considered that the apparatus may be adjusted for more precise inspection when the peach halves are all of substantially the same size, i.e., have been size graded.

The wetted peach halves P (some with halved pits or fragments thereof still clinging to the peach half and the other peach halves free or clean thereof) are loaded onto conveyor belt 10, using, for example, the loading system described in our above mentioned patent application, so that the peach halves P travel in single file and, preferably, although not necessarily, with slight spacing between successive peach halves. In other words, all the peach halves are transferred in single file past the inspection station 11. It is noted that the belt 10 terminates a slight distance before the inspection station 11, as shown in FIGURE 3. This means that the peach halves, due to their acquired momentum, are projected in free flight when and as they leave the belt 10 and travel past or through the inspection station 11, at which they are inspected for whole pits, halved pits or smaller fragments thereof.

Those peach halves which are free of any whole pits, halved pits or fragments thereof continue their movement in generally a straight line and are collected on a suitable conveyor belt (not shown) while those peach halves containing whole pits, halved pits or fragments thereof are deflected by a controlled air stream or blast in the general direction indicated by arrow 13 (FIGURE 2) on to another conveyor belt (also not shown), all in accordance with signals derived from sensing means located at the inspection station 11.

The particular means used for deflecting or rejecting the peach halves in the direction indicated by the arrow 13 (FIGURE 2) includes a solenoid operated type of airvalve 15, for projecting a blast of air through nozzle 16 on to the peach half while it is still in free flight.

The sensing means used for developing a voltage for operating the airvalve involves generally a source of radiation 18 within the lamp housing 20, and such source of radiation emits radiation predominantly blue in color or radiation predominantly in the infra-red or red portions of the spectrum, for the purpose of transmitting radiation through a peach half, and stationary radiation masking means 21 having a window or slit 21A which is generally arcuate-shaped, as shown in FIGURE 4, and through apertured portions in the scanning disc 24 and through the lens barrel 25 on to the photocell 26. Voltages developed by the photocell 26 are used to control the solenoid airvalve 15. When the source of illumination emits radiation predominantly blue, then, of course, it is preferred that the photocell have its maximum sensitivity in the blue portion of the spectrum and, further, when the source emits radiation predominantly red, the photocell 26 preferably has its maximum sensitivity in the red portion of the spectrum. In other words, the source radiation and the spectral sensitivity of the photocell 26 should be matched. It is understood, of course, that satisfactory operation is obtainable when radiation is in other portions of the visible spectrum.

The radiation masking means 21 is simply a metal plate having a slot or split portion 21A. Preferably, such slit, as illustrated, is generally rectangular but yet arcuate, with a radius corresponding to the distance between the center of rotation of disc 24 and any one of the equally radially spaced apertured portions 24A in the scanning disc 24. It is noted that the slit 21A has its longitudinal axis extending generally perpendicular to the direction of peach half movement (as shown in FIGURE 2).

By use of the scanning system involving scanning disc 24, the instantaneous coverage is limited to a very small area of the peach half. The scanning disc 24 is driven by the motor 23 and has a series of small holes spaced approximately two inches apart around the disc, which has an eleven inch diameter. The disc 24 is so located that as it rotates, the holes pass under the window or apertured portion 21A from end to end. As one hole 24A enters at one end of the window 21A, the adjacent hole leaves the other end of the window 21A. Thus, there is always an area at least equal to the area of only one hole 24A exposed to the window 21A at all times. The disc 24 is rotated at a high speed so that as the peach travels in one direction, the holes 24A scan at right angles to this direction. The speed of rotation of the disc 24 is in such ratio to the movement of the peach that the entire surface visible through the angular scanning window 21A is effectively scanned. The rate of scan is approximately one two-inch-long scan across the peach half for each one-eighth inch of peach travel. This means that with scanning holes of one-eighth inch diameter or smaller a fragment as small as one-eighth of an inch in diameter is detected.

Directly under the scanning disc 24 is a lens of seven and one-half inches focal length. The lens functions to project only the essentially parallel incident light rays onto the cathode of the phototube 26. By this expedient the need for separate collimators and additional phototubes is obviated. This high speed scanning system thus also eliminates the possibility of normally detectable fragments from being missed as in the arrangement shown in the above mentioned application when such fragment passes between collimators.

The lens 30 is approximately three inches in diameter and is mounted near the upper end of the cylindrical light tube or barrel 32. In the barrel 32 is a series of baffles 34, 35, 36, 37, 38 and 39 spaced about one and one-half inches apart. These baffles have cut out sections of increasing area, as shown in FIGURE 4, to allow the parallel light rays gathered by the lens 30 to pass through and to prevent substantially all of the stray non-parallel incident light rays from effecting operation of the photocell. It is noted that the lens 30 is actually disposed between the baffles 34 and 35 and very close to the upper or first baffle 34.

In general, the function of these baffles is to keep any random light rays from reflecting off the inner surface of the barrel 32 and striking the cathode of the tube 26. The tube 26 of the so-called "end-on" type in that the flat end of the tube contains the sensitive cathode material. The tube 26 may be the Dumont 6291 type. The tube is mounted so that its cathode is in the lower end of the lens barrel and so that the flat end of the tube is positioned in the focal plane of the lens.

By adjusting the size of the aperture 40 at the focal plane, it is a simple matter to accept only parallel light rays, or to include any increment of divergent rays desired. However, while it is possible to adjust this aperture 40 to accept only the true parallel light rays, this may require the use of such a small aperture that intense illumination is required. With an aperture 40 of one and one-quarter inches diameter at the focal point, satisfactory results are obtained with three thirty-seconds of an inch diameter holes 24A at the disc 24. The hole size in the disc 24 may be made larger if desired to provide more light when a lower separation ratio is acceptable.

In general, the larger the size of hole 24A, the smaller the lower focal plane aperture may be made without any loss in light energy but with a gain of using more nearly parallel rays. The term "loss in light energy" has reference to a comparison made with a smaller hole 24A and a larger lower aperture 40.

It is preferred that the optical system be such that only light from parallel incident rays be allowed to impinge on the phototube 26 to render the same more sensitive in the detection of fragments that may be up inside the peach cavity. In general, however, the system is required to accept an increment of other than parallel rays from above the scanning disc. However, acceptance of such rays which are other than parallel tends to impair or lessen the separation ratio; and, therefore, these rays are held at the absolute minimum necessary to the practical working of the system. This is so since, if light rays enter the scanning disc holes from all angles and impinge on the phototube, the scanning area is increased; and with an increased area to view, a minimum size fragment that would otherwise be detected by a truly parallel light system does not cast a large enough shadow to effect detection.

It is noted that if the peach halves were size graded, the apparatus could be adjusted to detect smaller pit fragments than otherwise. This is so since, when the apparatus is adjusted for very small fragments in large peaches, the same size fragment in a smaller peach half may go undetected. The system is adjusted with respect to the size peach half that predominates. By intermixing all sizes, an ideal setting is made for the largest size peach halves; and in such case, the substantially smaller halves with small fragments frequently go undetected.

Thus, light is transmitted through a peach half while it is passed, cup down, across the small window 21A. The amount of light, or lack of light, as is the case with the intervention of an opaque object such as a pit fragment, is recorded or detected by the tube 26. The term "recorded" has reference to a change in current through the tube 26 which supplies a signal that is amplified, shaped and used to operate the solenoid airvalve 15 to remove such peach half.

In developing such signal, the phototube 26 is normally in a saturated condition as now described. The term "saturation" has reference to the use of the phototube 26 in a manner such that with increased light intensity beyond a certain illumination level, there is little or no further increase in anode current. Such saturated condition is established mainly by the magnitude of the plate load resistance through resistances 43, 47. It is considered that proper conditions exist when substantially all of the available anode voltage appears as a voltage drop across a plate load resistance at a light level which exists when a fragment-free or clean peach half has its most dense portion overlying the apertured window 21A. Under such saturation condition, with more light, the voltage on the anode of phototube 26 does not change appreciably since all of the anode supply voltage already appears as a voltage drop across the tube load resistance.

In other words, by adjusting the light level, i.e., the illumination from the light source 18, so that the density of a clean peach half is sufficient to maintain the phototube in saturation, the most sensitive condition for detecting any increase in density exists. This condition of operation is indicated in FIGURE 11, wherein the response curve 44 is plotted with anode current as ordinates and degree of opacity, on a linear scale, as abscissa. A larger abscissa indicates a larger degree of opaqueness.

It is noted that curve 44 has a substantially flat upper portion representing a relatively small change in current even though there is a relatively large change in the light level. This region is the saturation region in which the phototube finds itself either in the presence or absence of a clean peach half. Should the peach half contain a fragment, there is a relatively large change in anode current in, for example, the region A—B in FIGURE 11. Preferably, the plate load resistance is of such size that the so-called threshold point A is in or near the saturation region defined by the upper substantially flat portion of the curve in FIGURE 11. In such case, a condition of no signal change occurs when the lights are properly adjusted from an average peach density to any brighter light level. A brighter light level in this instance would be a very thin peach or indeed the background illumination when there is no peach present. An advantage is that the only signal which is developed is that from densities greater than those obtained from clean peach halves.

In actual practice, the peach halves give some indication of density. By using different phototubes, the threshold point of maximum sensitivity may vary, but, in general, in all cases it has been found to be near the saturation condition as described above.

The phototube 26, of the photomultiplier type, has its cathode connected to the negative terminal of an 1800 volt source 46, the positive terminal of source 46 being grounded. The series of photomultiplier dynodes are connected in conventional manner to spaced points on a voltage dividing resistance 45, having one of its terminals connected to the negative terminal of source 46 and the other one of its terminals grounded.

The anode of tube 26 is connected through resistances 43 and 47 to a junction point of resistances 48 and 49, the latter junction point being in a voltage dividing circuit which is maintained at approximately plus 150 volts with respect to the grounded last dynode. Resistance 48 is shunted by condenser 51. Resistances 48 and 49 are serially connected with the 295 volt source 53 which has its negative terminal grounded. With light present on the photo cathode there is anode current flow through resistances 43 and 47 to the plus 150 volt supply junction 48A. This anode current causes a voltage drop across serially connected resistances 43 and 47. With a certain amount of illumination there will be enough anode current through resistances 43 and 47 to cause the sum of their voltage drops to equal the 150 volt supply source, thereby dropping the anode voltage to zero. More illumination will give very little if any more anode current because with zero anode potential, with respect to the last dynode, there is no more electron attraction. This condition is referred to as saturation. The junction point of resistances 43 and 47, which is the signal take-off point will have some value of voltage depending on their ohmic value. With resistances 43 and 47 both of equal value the voltage at their junction will be one-half of the source voltage under conditions of saturation.

When the resistance of phototube 26 is increased, for example, the results of a pit fragment, the anode current becomes less thereby causing less voltage drop across the anode load resistances 43 and 47. The result is that as less light is received the anode voltage becomes more positive as does the signal take-off point which is the junction of 43 and 47. The junction point of 43 and 47 is electron coupled to the grid of cathode follower tube 50. This could just as well be condenser coupled as far as the phototube anode circuit is concerned. The cathode follower functions to supply high impedance coupling to the phototube anode circuit and deliver in its cathode circuit the same signals of low impedance.

The cathode follower consists of tube 50 with a grid resistance 42 connected from grid to the junction point of cathode bias resistor 54 and cathode load resistor 41. Resistance 41 is the cathode load resistance and is connected from ground to one end of cathode bias resistor 54 along with grid resistance 42. The anode of tube 50 is connected directly to the positive terminal of source 53. The control grid of tube 50, being electron coupled, follows the changes in voltage of the character illustrated at 56 and reproduces the same changes across its cathode resistance 41 at low impedance.

The cathode load resistance 41 is a potentiometer type resistance which may be adjusted so that all or any proportion of the signal may be applied to the control grid of the nonlinear amplifying tube 60 through coupling condenser 61 and resistance 62. The control grid of tube 60 is returned to ground through resistances 62 and 63. The signal applied to such control grid is indicated at 65. The cathode of tube 60 is returned to ground through a parallel resistance and condenser combination 67, 68. The anode of tube 60 is connected through resistance 70 to the voltage source 53. The tube 60, as well as the succeeding amplifier tube 72, are each operated as nonlinear amplifiers in that small signals are amplified in proportionately less degree than are signals of larger amplitude. Thus a clean peach half may produce, for example, a voltage variation of one volt, and a peach half containing a fragment may produce, for example, a variation of three volts. After amplification, a signal of one and one-half volts is obtained in accordance with the clean peach and as much as twenty volts are obtained for the peach half containing the fragment. This represents a ratio increase of from three to one to thirteen to one by virtue of the nonlinear amplification in stage 60. The applicable voltage in stage 60 is represented at 74. One function of the second amplifier stage 72 is to provide phase inversion, i.e., to obtain a positive pulse represented at 76, while at the same time to also impart further nonlinear amplification of the character previously described. For these purposes, the anode of tube 60 is coupled to the control grid of tube 72 through coupling condenser 78. The control grid of tube 72 is connected to the junction points of resistances 80 and 81 through resistance 82, such resistances 80 and 81 being serially connected with source 53 to provide a voltage dividing network. The cathode of tube 72 is returned to ground through resistance 84. The anode of tube 72 is connected to the source 53 through its load resistance 86 and such anode is coupled via the serially connected condenser 90 and resistance 91 to the control grid of the one-shot multivibrator stage 93, and, more specifically, to the control grid of tube 94. The circuitry of this multivibrator stage 93 is considered conventional and it operates to produce an elongated positive pulse 96 as the result of the positive pulse, at 76, applied to control grid of tube 94.

This positive pulse 96 is electron coupled to the control grid of the cathode follower tube 99. The cathode of tube 99 is returned to ground through the serially connected resistances 100 and 101. The positive pulse developed across the junction of resistances 100 and 101 is applied to the conventional thyratron control 104 to develop a power pulse 105 which is applied to the solenoid airvalve 15 to cause the same to operate, i.e., to produce a blast of air for diverting the travel of the peach half, as indicated in FIGURE 2.

The operation of the circuitry above is described in relationship to a change in amplitude in voltage occasioned when a pit fragment passes over the scanner window and decreases when the fragment leaves the window. Actually, when using the scanning wheel, a series of holes 24A pass across the window 21A at high speed. As a pit fragment passes over the window, it blocks the light from an area of the window and at the same time the holes in the scanning disc pass under this same shadow area. With the speed of the scanning holes 24A at about sixteen times faster than the peach fragment speed, the fragment causes a series of interruptions in light level as each hole 24A passes under the fragment. The larger the size of the fragment, the more times will a different hole in the scanning disc pass across the fragment before it leaves the window. Each time a new hole passes under the fragment, a new signal is detected. This means that for a complete pit half, a new hole in the scanning disc passes under the pit as many as twelve times, and the output is actually under this condition a series of pulses each of the same and relatively large amplitude. In this respect, the wave forms represented at 56, 65, 74 and 76 show a single pulse of large amplitude on a "pedestal" which varies in amplitude in relatively small amount and which actually comprises a wavy line that indicates the changes in density in clean portions of the same peach half. In other words, these wave forms represent a condition wherein the pit fragment is indeed small, but if the pit fragment were larger, there would be a greater number of large amplitude pulses on the "pedestal."

The multivibrator, stage 93, is preferably fired once per peach half regardless of the size of the pit fragment for purposes of conserving the supply of air which is furnished to the solenoid airvalve 15 and also to assure the travel of deviated peach halves along generally the same path or direction. However, when there is an unlimited supply of air, the circuitry may be adjusted so that the thyratron control 104 is controlled in accordance with each one of the plurality of pulses that may be developed from a single fragment. In this latter case, each output pulse in turn causes the restarting of the thyratron control 104 which, in turn, holds the solenoid airvalve 15 open for a longer time interval.

For purposes of analyzing the character of the pulses derived from the phototube 26, reference is made to FIGURES 14 and 15. FIGURE 14 represents the type of output signal developed by the photocell 26 from a clean peach half, and FIGURE 15 shows a comparable signal derived from the peach half having a fragment clinging in the pit cavity. It will be observed that a large peach half completely covers the scanning window 21A. This means that the light received by the phototube 26 under this condition is of decreased intensity, i.e., less than the background light or highest light level. As the holes 24A in the scanning disc pass under this large peach half (one covering the whole window 21A), various density changes are observed by the photocell 26, even though the peach half is a clean one. These density changes are referenced with respect to the average density of the peach half. Thus there occurs a slow rise in the base line of the signal pattern, as illustrated in FIGURE 14, with the peach density changes appearing as a series of small pulses. When there is a pit fragment in the peach half, a series of tall pulses project upwardly beyond those variations representative of the peach meat density variations, the number of such "superimposed" pulses being indicative of the size of the pit fragment. It is considered that satisfactory results may be obtained either with or without the slow rise of the base line of the pattern indicated in both FIGURES 14 and 15. This slow rise of the base line may be eliminated, if desired, by using small coupling condensers 61 and 78 in the amplifier so that the low frequency component is substantially eliminated. It is considered that when the peach halves are size graded and/or peeled, then it is better to use large coupling condensers and thus maintain the low frequency rise in the base line of the signal pattern illustrated in FIGURES 14 and 15.

While the phototube 26 is used in a manner in which it is flooded with light so as to record any lesser degree of light as the peach pit passes between the light source and the phototube, as described in more detail above, it is desirable to eliminate any direct light rays from shining directly on to the phototube when a peach half is not present. For this purpose four projector flood light type of lamps 18A are mounted approximately a foot above and out about eight inches to the sides and ends of the scanner window. These lights 18A are pointed down at an angle to the window so that no direct light rays enter the scanning window hole 21A. Further, a cooling cell 18B comprising two round pieces of spaced glass 18C, 18D, with water running between the two, is used in dissipating the relatively large amount of heat created by the four lamps 18A. The two pieces of glass 18C and 18D are spaced by a round one-half inch thick of rubber gasket material 18E through which the water inlet and outlet 18F and 18G respectively pass. Thus the cooling cell is mounted just under the four lights and serves as a light housing window. It is considered that the use of infra-red light source is better suited for whole pit detecting than for fragment detecting, using a phototube 26 more sensitive in the infrared region, since the infra-red light "sees" through the small fragments, whereas whole pits are so dense that they cast sufficient shadow for detection purposes.

*Two-way separation*

A two-way separation system is described in conjunction with FIGURES 12 and 13 and functions to separate peach halves having whole or halved pits from those having relatively small fragments. The photocell 26 in FIGURE 12 is considered identical with the identically numbered photocell in FIGURE 1 and is arranged in an identical optical system as shown in FIGURE 1. Differentiation between pits and pit fragments is accomplished in accordance with the number of pulses developed during the scanning operation, i.e., the longer an opaque object remains over the window 21A, the greater the number of pulses that are obtained. With the peach halves all travelling at the same speed, a peach with a fragment develops fewer pulses than a peach half with a whole pit. Thus the signal represented at 106 obtained from the output of the cathode follower stage 50 comprises many pulses of short duration and represents a signal derived from a whole pit. The signal 106 is applied through coupling condenser 107 to two channels 108 and 109. Such signal 106 is integrated in channel 108 by the integrating network 110 so as to obtain the integrated signal 111 which has a maximum amplitude representative of the number of such pulses that comprise signal 106. The integrating network 110 includes the adjustable resistance 112 which may be adjusted to obtain the greatest amplitude change from a predetermined number of pulses. The integrated signal 111 requires amplification and for that purpose two stages of amplification comprising tubes 114 and 115 are provided whereby the amplified integrated signal appears on the anode of tube 115 as represented by the signal 117. The input circuit to the second amplifier stage 115 includes a potentiometer type resistance 118 serving as a fragment size selector control. The function of this selector control is to vary the amount of signal amplification. By this expedient, it is possible to make any size input signal 111 fire, or not fire, the whole pit trigger circuit or multivibrator stage 120. When the multivibrator stage 120 is fired, an output signal 122 is developed on the anode of tube 124 and such signal 122 is applied to the control grid of the cathode follower stage 126 to develop the output pulse 127 which, in turn, operates the thyratron control 128 to operate the airvalve 129 and produce a blast of air. When the stage 120 is fired, another signal 130 is developed on the anode of tube 132 and this signal, a negative going disabling pulse, shown also at 134A, is applied to the control grid of the first tube 135 of the multivibrator stage 136 in channel 109 for purposes of disabling such channel when a whole pit is detected.

Referring to channel 109, the signal 106 is applied to the control grid of the first tube 138 of the multivibrator stage 139, to produce the negative going signal 140 on the anode of tube 138. Such signal 106 is subjected to a differentiating network 142 to produce the differentiated signal represented at 145 and applied to the control grid of tube 135 at which the same is mixed with the signal 134A to produce the composite signal 147. The stage 139 thus functions generally as a signal-shaper and delay means. The stage 139 has such a pulse width time constant as to give only one output pulse even though many pulses are applied to the control grid of tube 138. By this expedient one pulse of fixed length F is obtained for each detection, whether it be from a fragment or a whole pit. It is observed that the trailing edge of pulse 140 appears as a positive pulse G and such pulse G appears with some time delay represented by the pulse duration F. As indicated above, the grid of the tube 135 is a mixing point in which the delayed sharp positive signal G is mixed with the long negative whole pit trigger signal 134A. Thus for each opaque object detected, the stage 139 is fired and it, in turn, supplies a delayed sharp positive signal G to the fragment trigger stage 136. Such positive signal G would, in the absence of the pulse 134A, fire the stage 136 but such firing is prevented when the negative signal 134A is present. By adjustment of resistance 118 any desired size of peach pit can be made to fire the whole pit trigger stage 120, thereby cancelling out the shaper signal G and causing the whole pit signal 122 to prevail.

When the stage 136 is fired as a result of positive pulse G acting alone, an output signal 148 is developed on the anode of tube 149, and such signal is applied to the control grid of the cathode follower stage 150 to obtain the output signal 152 which, in turn, operates the thyratron control 153 to operate the solenoid airvalve 134 to produce a blast of air. The airvalves 129 and 134 may be arranged with respect to the direction of peach travel indicated by the arrow 156 in FIGURE 13 to develop cross blasts of air for defecting the peach half either to the right or to the left from its normal path depending upon which one of the two airvalves 129, 134 is operated. Of course, as explained above, only one of the airvalves 129 or 134 is operated at one particular time; and, of course, where the peach half is clean, neither one of the airvalves 129 nor 134 is operated. The circuitry is adjusted so that the pulse length F is long enough so as not to allow the stage 139 to return to a condition in which it can be retriggered until there are no more pulses 106. The time constant involved is one longer than the time it takes the largest anticipated whole split pit to pass over the scanner window 21A (FIGURE 1). Further, the time constant of the stage 120, i.e., the length of pulse 134A, is longer than that of the signal shaper and delay trigger stage 139 in order to cancel out the delayed signal G and prevent the fragment trigger stage 136 from firing.

It is observed that the phototube does not view the whole pit cavity at any one time so that it does not "see" the shape of a fragment whose dimensions exceed the instantaneous scanning area, but, instead, it registers how long there is an opaque object over the scanning window. With this in mind, it is seen that an oblong shaped fragment will be classified as a small fragment or as a large fragment depending on its orientation as it passes the scanning window.

While the scanning means preferably comprises a scanning disc with circular holes therein, as shown in connection with FIGURES 1 and 4, under certain conditions it may be possible to use, with perhaps less satisfactory results, other scanning means of the character illustrated as modifications in FIGURES 5, 6, 7 and 8.

In FIGURE 5, the scanning means comprises a flat slotted endless belt 158. The belt 158 contains parallel slotted apertured portions 158A that extend diagonally to the direction of belt travel and are so arranged that the end of each slot in the direction of travel overlaps the adjacent slot. The belt 158 is driven around two pulleys 160, 161, spaced about a foot apart. The top reach and the lower reach of the belt are used to obtain a parallel scan. A top plate or window 163, with a slit 163A, extending at right angles to the belt travel is positioned over the top reach of the belt. Another similar apertured plate or window 165 is positioned over the top of the lower reach of the belt with the slits in both plates 163 and 165 aligned. With light from source 167 shining down on the top plate and through the slits in both belts, it will be seen that substantially only parallel rays of light are passed through the slit in the lower plate 165. The slits in the top reach of the belt coincide with the slits in the lower reach of the belt at only one place along the stationary slit in the plates. As the belt is driven, the point at which the two belts coincide will pass from one end of the stationary slit to the other to achieve a scanning action.

In the modification shown in FIGURE 6, the scanning means comprises a scanning disc 170 with slits located around the disc in its outer two inches of periphery. A top plate 172 with a slit 172A is placed as close as possible to the scanning disc 170. As the disc 170 is rotated by motor 173, the slits in the disc pass under the stationary slit in the top plate 172 and a scanning action is obtained. Some unevenness of line from one end of the scan to the other occurs for the reason that the slits in the disc 170 pass the stationary slit 172A in an arc. By passing in an arc, the wheel slits change their angle relationship with respect to the stationary slit 172A to change the area of the aperture. Also, when straight slits are provided in the disc 170, the scanning speed is not linear. This is caused by the outer ends of the slits in the scanning wheel travelling faster than the inner ends. To compensate for this condition, the slits 170A are curved, as shown, to make the scan more nearly linear. Alternatively, two scanning discs 170 may be used with the second disc mounted on the same rotational axis and spaced at some distance such as, for example, three inches apart. In such case, another stationary plate 172 with a similar fixed slit 172A is used in conjunction with such additional disc 170. The slits in the two stationary plates are, of course, aligned to receive light from the source 175.

The arrangement shown in FIGURE 7 also includes a disc 178, a light source 179 and an apertured window 180 spaced above the disc 178. Instead of having slits in the scanning disc, the scanning disc 178 is provided with a series of round holes 178A spaced at two inch intervals around the wheel and the slit 180A is wider than the diameter of holes 178A. The length of the slit 180A is just long enough to allow only one hole in the scanning wheel to come into view at a time. As one hole enters into the scanning window, another hole is just leaving. In this way, there is always one hole in view of the scanning window at all times. The sides of the window 180A may be curved to conform to the radial path of the scanning holes. A light collimator 183 is positioned under the disc 178 to direct light on to the phototube 185. The collimator 183 comprises thin sheets of Lucite, painted black on both sides and stacked close together, as shown in FIGURE 9. When the paint is dry, the sheets are bonded together to form a laminated block of Lucite. After polishing the ends and painting the edges, a useable collimating means is provided. When it is desired to increase the scanning lens, the arrangement shown in FIGURE 7 may incorporate mirrors as illustrated in FIGURE 8 in which two first surface mirrors 190 and 191 have their planes diverging in the direction of the phototube 192. These mirrors 190 and 191 are so arranged that when the collimated beam of light coming from the end sections of the window strikes them, the light is reflected on to the cathode surface of the tube 192.

In those instances where the phototube does not properly saturate, as described above, a clamp circuit, as shown in FIGURE 10, may be incorporated in the system. The clamp tube is the diode 194 having its cathode connected to the junction point of resistances 196 and 198, the resistance 198 being the load resistance and having one terminal connected to a 150 volt source. The junction point of resistances 196 and 198 is coupled via a condenser 200 to the control grid of the amplifying tube 202 which has its control grid and cathode returned to ground through resistances 204 and 206, respectively. The anode of the diode 194 is connected to the adjustable tap on the potentiometer resistance 208 representing a source of variable voltage. By this expedient, signals are eliminated which may otherwise be caused by light levels brighter than that resulting from light transmission through a clean peach. By thus connecting the clamp tube 194 with its cathode connected to the signal take-off point of the load resistance 198 and its anode connected to a variable voltage control, the signal point may be clamped so that only signals above any desired setting of resistance 208 have their influence on tube 202. The resistance 208 is adjusted so as to allow signals caused by more dense objects than a clean peach to be detected.

While the particular embodiments of the present invention have been shown and described, it will be obvious to those skilled in the art that changes and modifications may be made without departing from this invention in its broader aspects and, therefore, the aim in the appended claims is to cover all such changes and modifica-

We claim:

1. In the method of classifying a peach half having a pit fragment from peach halves having no pit fragment attached thereto, the steps including moving said peach half along a path, scanning said peach half with a spot of radiation which moves and is transmitted through that portion of the peach half adjacent said fragment, said radiation being in the visible range of the spectrum, effectively measuring the radiation transmitted through said peach half to obtain a measurement as to its translucency, and deflecting said peach half from said path in accordance with such measurement.

2. In a system for classifying peach halves having pit halves or pit fragments attached thereto from peach halves having no pit fragment attached thereto, the steps comprising scanning the pit cavity with a moving spot of light which is transmitted through that portion of the peach half defining said cavity, deriving a number of pulses in accordance with the translucency of the pit half or fragment thereof, as the case may be, and classifying said peach half in accordance with the number of pulses to separate peach halves having pit halves from peach halves having fragments of pits attached thereto.

3. In a system of the character described a light source wherein it is desired to separate a peach half having a fragment attached thereto from a peach half having no pit fragment attached thereto, means for moving a peach half with a pit fragment attached thereto past said light source for illumination thereby and transmission of light therethrough, means for scanning the pit cavity of the peach half while it is moving and is illuminated by said source, to obtain transmitted light which is transmitted through that portion of the peach half defining said cavity and through said scanning means and which varies in intensity, pulse generating means responsive to said light transmitted through said peach half and said scanning means for developing pulses in accordance with the translucency of said fragment, and means operated by said pulse generating means for selecting the peach half in accordance with said pulses.

4. In a system of the character described wherein it is desired to separate a peach half having a fragment attached thereto from a peach half having no pit fragment attached thereto for separating peach halves having pit fragments attached thereto, means for illuminating and transmitting light through the peach half, a photocell scanning means interposed between the peach half and said photocell for intercepting the light transmitted through the peach half and producing a scanning action of the pit cavity of the peach half, lens means interposed between the peach half and the photocell for directing light transmitted through said peach half and said scanning means by said illuminating means onto said photocell, pulse generating means including said photocell responsive to light falling on said photocell for developing pulses in accordance with the translucency of the peach half, and means operated by said pulse generating means for classifying said peach half in accordance with said pulses.

5. An arrangement as set forth in claim 4 in which light baffle means are interposed between said lens means and said photocell to assure the impingement of substantially parallel rays of transmitted light onto said photocell.

6. In a system of the character described for classifying peach halves having pit fragments attached thereto from peach halves having no pit fragment attached thereto, the combination comprising, illuminating means, means for moving said peach half along a first direction, a photocell scanning means interposed between said illuminating means and said photocell for producing a spot of scanning light which travels in a direction substantially perpendicular to said first direction, a lens barrel interposed between said peach half and said photocell, light baffle means in said lens barrel for assuring the impingement of substantially only parallel rays transmitted through said peach half onto said photocell, said photocell being operated in a substantially saturated condition when no peach half is being scanned, pulse responsive means including said photocell for classifying said peach half, said pulse responsive means including a nonlinear amplifier for amplifying pulses derived from said photocell such that the smaller pulses are amplified to a smaller degree than are the larger pulses derived from said photocell.

7. An arrangement as set forth in claim 6 including means responsive to the number of pulses for separating peach halves having large pit fragments from those having small pit fragments.

8. An arrangement as set forth in claim 6 in which said scanning means comprises a motor driven disc having a series of circular apertured portions.

9. An arrangement as set forth in claim 6 in which said photocell is of the end-on type having its axis aligned with said lens barrel.

10. In a system of the character described for separating peach halves having halved pits from peach halves having pit fragments attached thereto, means for developing a series of pulses, the number of which is representative of the size of the pit half or fragment, as the case may be, a first signal channel coupled to said means, a second signal channel coupled to said means, first peach half selecting means coupled to the output of said first channel, second peach half selecting means coupled to the output of said second channel, pulse integrating means in said first channel for developing a voltage the intensity of which is representative of the number of said pulses, means in said first channel operated when said voltage achieves a predetermined intensity for operating said first selecting means and for disabling said second channel, said second channel thereby being operative to operate said second selecting means only when the number of said pulses is of insufficient number to produce said voltage of said predetermined magnitude.

11. A system as set forth in claim 7 in which said pulse generating means includes a photocell operated in accordance with said transmitted light, pulse amplifying means coupled to the output of said photocell and clamping means connected to said amplifying means to prevent amplification of pulses below a predetermined magnitude but to allow operation of said amplifying means when the pulses developed by said photocell are above said predetermined magnitude.

References Cited in the file of this patent

UNITED STATES PATENTS

| | | |
|---|---|---|
| 1,693,510 | Kauch et al. | Nov. 27, 1928 |
| 1,751,584 | Hansell | Mar. 25, 1930 |
| 1,852,784 | Lux | Apr. 5, 1932 |
| 1,943,278 | Thompson et al. | Jan. 9, 1934 |
| 2,190,563 | Horsfield | Feb. 13, 1940 |
| 2,205,397 | Drake | June 25, 1940 |
| 2,332,308 | Dresser | Oct. 19, 1943 |
| 2,474,230 | Cox | June 28, 1949 |
| 2,514,284 | Le Page | July 4, 1950 |
| 2,532,644 | Robinson | Dec. 5, 1950 |
| 2,773,596 | Bartlett | Dec. 11, 1956 |
| 2,803,754 | Cox | Aug. 20, 1957 |
| 2,806,986 | Luhn | Sept. 17, 1957 |
| 2,881,919 | Bartlett | Apr. 14, 1959 |

FOREIGN PATENTS

| | | |
|---|---|---|
| 272,521 | Great Britain | Sept. 6, 1928 |
| 504,683 | Great Britain | Apr. 28, 1939 |